United States Patent
Hockings et al.

(10) Patent No.: US 10,178,096 B2
(45) Date of Patent: Jan. 8, 2019

(54) ENHANCED DATA LEAKAGE DETECTION IN CLOUD SERVICES

(71) Applicant: International Business Machines Corporation, Armonk, NY (US)

(72) Inventors: Christopher J. Hockings, Burleigh Waters (AU); Budi Mulyono, Singapore (SG); Sumana S. Narasipur, Singapore (SG); Codur S. Pranam, London (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/475,173

(22) Filed: Mar. 31, 2017

(65) Prior Publication Data

US 2018/0288051 A1 Oct. 4, 2018

(51) Int. Cl.
*G06F 21/60* (2013.01)
*H04L 29/06* (2006.01)

(52) U.S. Cl.
CPC .............. *H04L 63/10* (2013.01); *H04L 63/08* (2013.01); *H04L 2463/121* (2013.01)

(58) Field of Classification Search
CPC ................................ G06F 21/60; H04L 63/30
See application file for complete search history.

(56) References Cited

U.S. PATENT DOCUMENTS

| | | | |
|---|---|---|---|
| 9,311,495 B2 | 4/2016 | Readshaw et al. | |
| 9,349,016 B1 * | 5/2016 | Brisebois | H04L 63/20 |
| 2014/0026182 A1 | 1/2014 | Pearl et al. | |
| 2015/0310195 A1 | 10/2015 | Bailor et al. | |
| 2015/0319185 A1 | 11/2015 | Kirti et al. | |
| 2016/0036855 A1 | 2/2016 | Gangadharappa et al. | |
| 2016/0315930 A1 | 10/2016 | Kim et al. | |
| 2016/0275303 A1 | 11/2016 | Narayanaswamy et al. | |
| 2016/0344736 A1 | 11/2016 | Khait et al. | |

FOREIGN PATENT DOCUMENTS

| | | |
|---|---|---|
| WO | 2015051331 A1 | 4/2015 |
| WO | 2015070260 A1 | 5/2015 |

OTHER PUBLICATIONS

Hockings et al., "Enhanced Data Leakage Detection in Cloud Services", U.S. Appl. No. 15/708,167, filed Sep. 19, 2017, 42 pages.
IBM Appendix P, list of patents or patent applications treated as related, Sep. 19, 2017, 2 pages.
Brown, Sean, "How to Fix the Cybersecurity Blind Spot That Is Shadow IT", Security Intelligence, <https://securityintelligence.com/how-to-fix-the-cybersecurity-blind-spot-that-is-shadow-it/>, May 23, 2016, 6 pages.

(Continued)

*Primary Examiner* — Izunna Okeke
(74) *Attorney, Agent, or Firm* — Gilbert Harmon, Jr.

(57) ABSTRACT

Embodiments describing an approach to receiving user data, and monitoring a user data transaction. Monitoring a user data transaction. Identifying a plurality of attribute elements associated with the user data and the user data transaction. Creating benchmark data based on one or more identified attributes and user data gathered from a user data transaction, and storing, by the one or more processors, benchmark data.

17 Claims, 6 Drawing Sheets

(56) References Cited

OTHER PUBLICATIONS

Coleman et al., "Symantec Delivers on Rapid Integration With Blue Coat to Offer Cloud Generation Data Protection", Symantec, Press Releases/2016, © 1995-2016 Symantec Corporation, 8 pages.

Coles, Cameron, "Decision Time: Deploying CASB on Premises or in the Cloud", Do CASBs Belong on Prem or in the Cloud? | Skyhigh Networks, Copyright © 2017 Skyhigh Networks, printed Jan. 5, 2017, 7 pages, <https://www.skyhighnetworks.com/cloud-security-blog/decision-time-deploying-casb-on-premises-or in the cloud/>.

Kirti, Ganesh, "Dealing With Dropbox: Unmasking Hackers with User Behavior Analytics", CSA, Cloud Security Alliance, Sep. 7, 2016, © 2009-2016, 6 pages, <https://blog.cloudsecurityalliance.org/2016/09/07/dealing-dropbox-unmasking-hackers-user-behavior-analytics/>.

Viell et al., "The NIST Definition of Cloud Computing", The National Institute of Standards and Technology, U.S. Department of Commerce, Special Publication 800-145, Sep. 2011, 7 pages.

Vijayan, Jaikumar, "Cloud DLP: Can gateways rise to the challenge?", TechTarget, published Apr. 2016, Copyright 2011-2017, TechTarget, 13 pages, <http://searchcloudsecurity.techtarget.com/feature/Cloud-DLP-Can-gateways-rise-to-the-challenge>.

"Centrify partners with leading Cloud Access Security Brokers to enhance cloud security for SaaS applications", Computerworld, <http://www.computerworld.com.au/mediareleases/26095/centrify-partners-with-leading-cloud-access/>, Nov. 9, 2015, 6 pages.

\* cited by examiner

ENHANCED DATA LEAKAGE DETECTION IN CLOUD SERVICES

BACKGROUND OF THE INVENTION

The present invention relates generally to the field of data security, and more particularly to cloud based data leakage protection.

Current, data leakage protection (DLP) solutions are very course grained and specific to a particular issue. Additionally, DLP solutions protect data from threats such as eavesdropping, 'man in the middle attack', and unauthorized access by privileged users within cloud providers. Such solutions aim to also insulate the data owner from deficiencies of 'the cloud' by applying security controls agnostic to the public domain data that is being transported within 'the cloud.' However, these solutions are very targeted and very specific to use. A more recent solution to DLP are cloud access security brokers (CASBs) solutions, which propose ways to provide protection of data for specific cloud software as a service (SaaS) providers. The aforementioned cloud security solutions, take advantage of a 'man the middle' capability to cater for course grained data protection use cases. For example, if an end user wants to share data with a SaaS provider, a proxy understands the message format, performs encryption on data elements before sending the desired shared data to the SaaS service, and the reverse occurs when the data is being accessed. However, there are deficiencies to these aforementioned security methods. These security methods aim to provide data protection generally via encryption, which can be very expensive. These approaches also require users to access data through known proxy solutions so encryption and un-encryption processes can be completed before a user can store and/or read the data, which is not always possible

SUMMARY

According to one embodiments of the present invention a method, a computer program product, and a system for improving data leakage detection in cloud services is provided. A computer implemented method includes receiving, by the one or more processors, user data. Monitoring, by the one or more processors, a user data transaction. Identifying, by the one or more processors, a plurality of attribute elements associated with the user data and the user data transaction. Creating, by the one or more processors, benchmark data based on one or more identified attributes and user data gathered from a user data transaction, and storing, by the one or more processors, benchmark data.

DETAILED DESCRIPTION

Figure 1A:
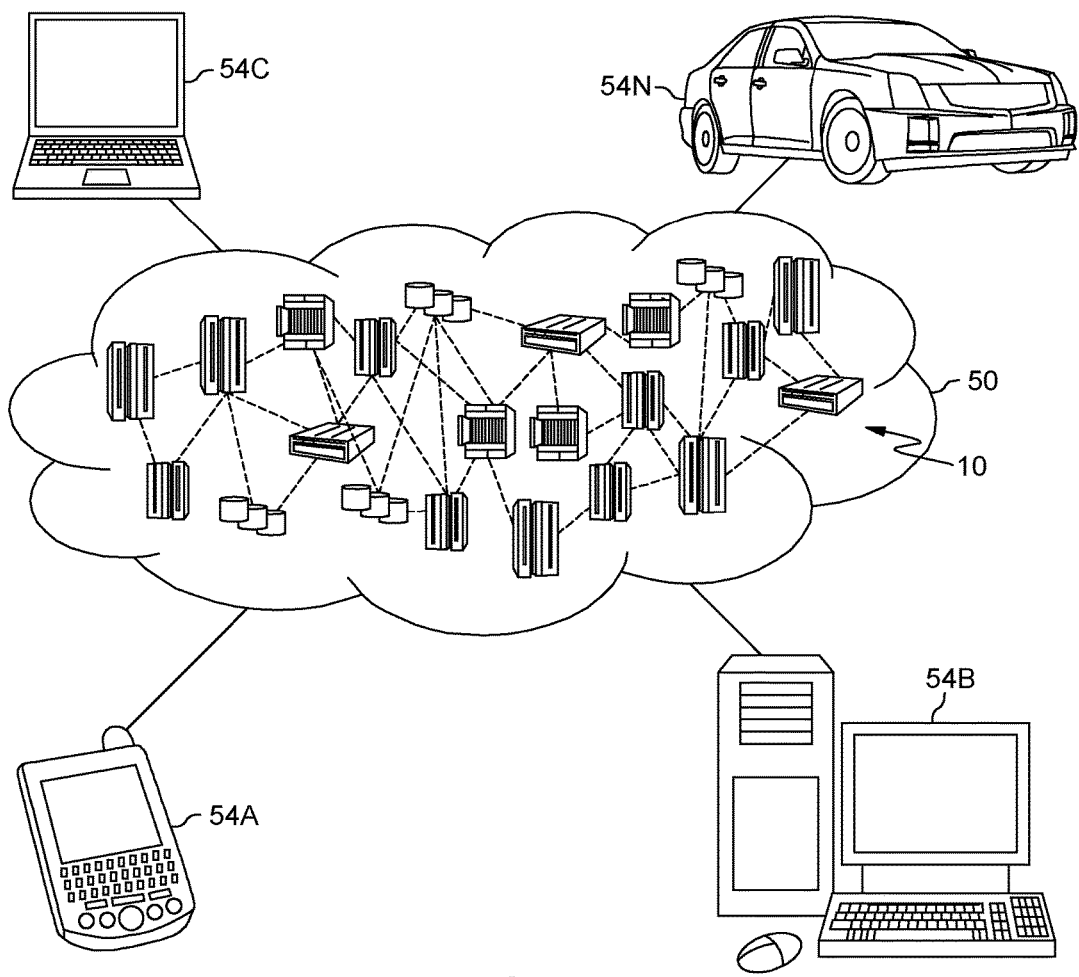
FIG. 1A-C depicts a cloud computing environment, abstraction model layers, and a block diagram illustrating a distributed data processing environment, in accordance with an embodiment of the present invention.

Embodiments of the present invention recognize that the combination of text scanners and/or application program interface (API) scanners and/or cloud access security brokers (CASBs) can improve data leakage protection (DLP). This combination provides advantages and benefits to DLP. Embodiments of the present invention improve previously limited data leakage protected and have the ability to identify potential threating attributes and influence policy. For example, the aforementioned technique of interlinking communication between API scanners and CASBs provides the ability to automate discovery of elements of data that are altered, which in turn allows for greater data governance and classification. Additionally, the technique can reduce the cost of DLP solutions as automation can be used to develop DLP policy for enforcement at gateway(s) and can improve security by applying user access controls that are SaaS agnostic. Implementation of embodiments of the invention can take a variety of forms, and exemplary implementation details are discussed subsequently with reference to the Figures. The rise in cloud based services, in today's world, has created a necessity to better secure information stored on cloud based services. Data leakage detection component improves cloud based security and the overall filed of cloud and/or information security. Additionally, the ability to identify and manage out of band data transactions contributes to the improvement of data leakage detection in cloud services. Further, the present invention improves at least one general function of computing systems. One such example of an improvement to the functioning of a computing system includes a reduction in the overall computational overhead for data leakage detection. In this particular improvement, the computing system increases date leakage detection accuracy by leveraging identified attributes, which ultimately reduces the computational overhead needed to identify the desired, flagged attributes.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1A, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1A are intended to be illustrative only and that computing nodes 10 and cloud computing environment 50 can communicate with any type of computerized device over any type of network and/or network addressable connection (e.g., using a web browser).

Figure 1B:
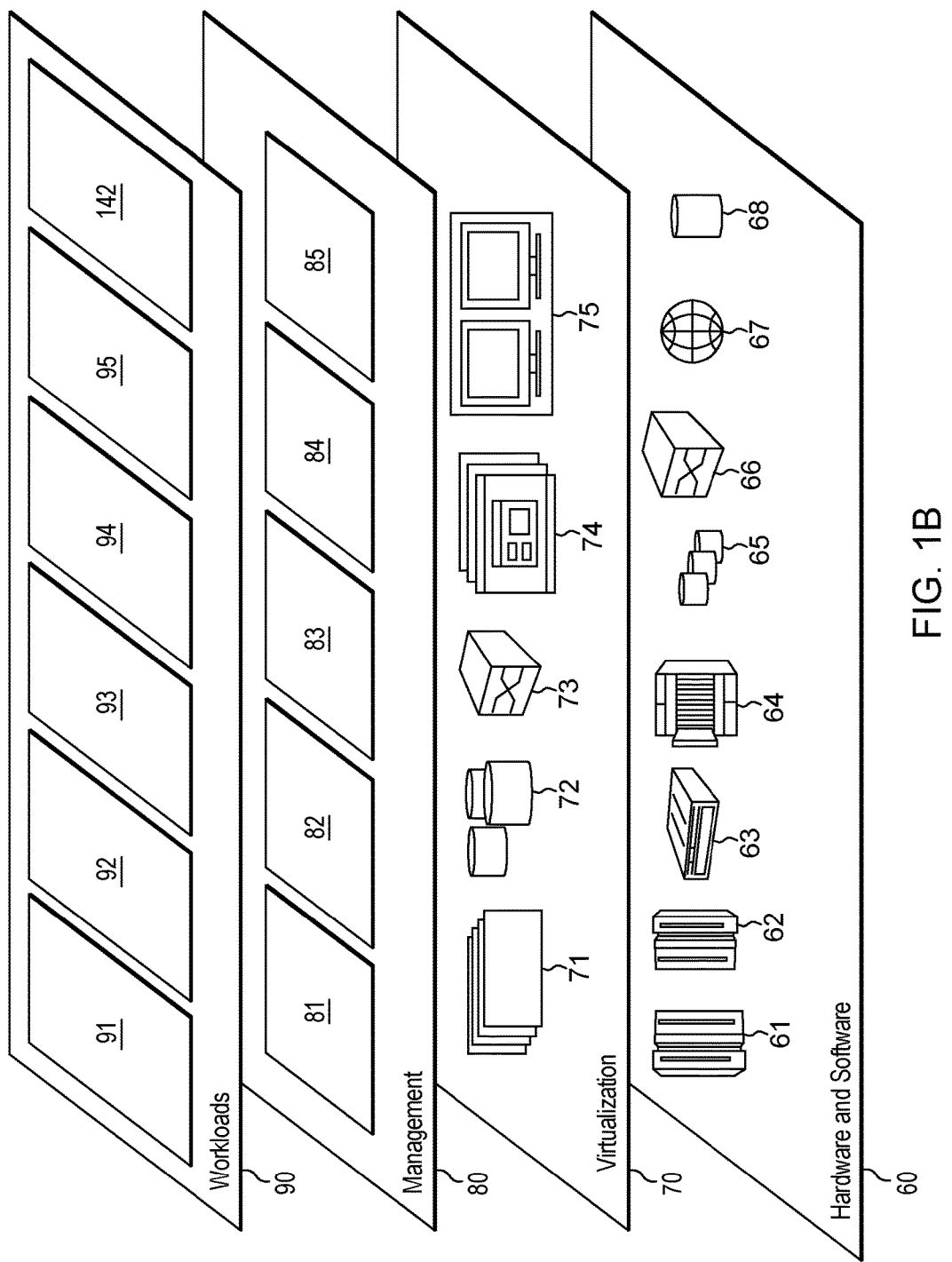

Referring now to FIG. 1B, a set of functional abstraction layers provided by cloud computing environment 50 (FIG. 1A) is shown. It should be understood in advance that the components, layers, and functions shown in FIG. 1B are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68 which can be an identity management application (e.g., VMM). It should be noted that the term "database software 68" can herein be used interchangeably with "identity management application 68."

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and data leakage detection component 142.

Figure 1C:
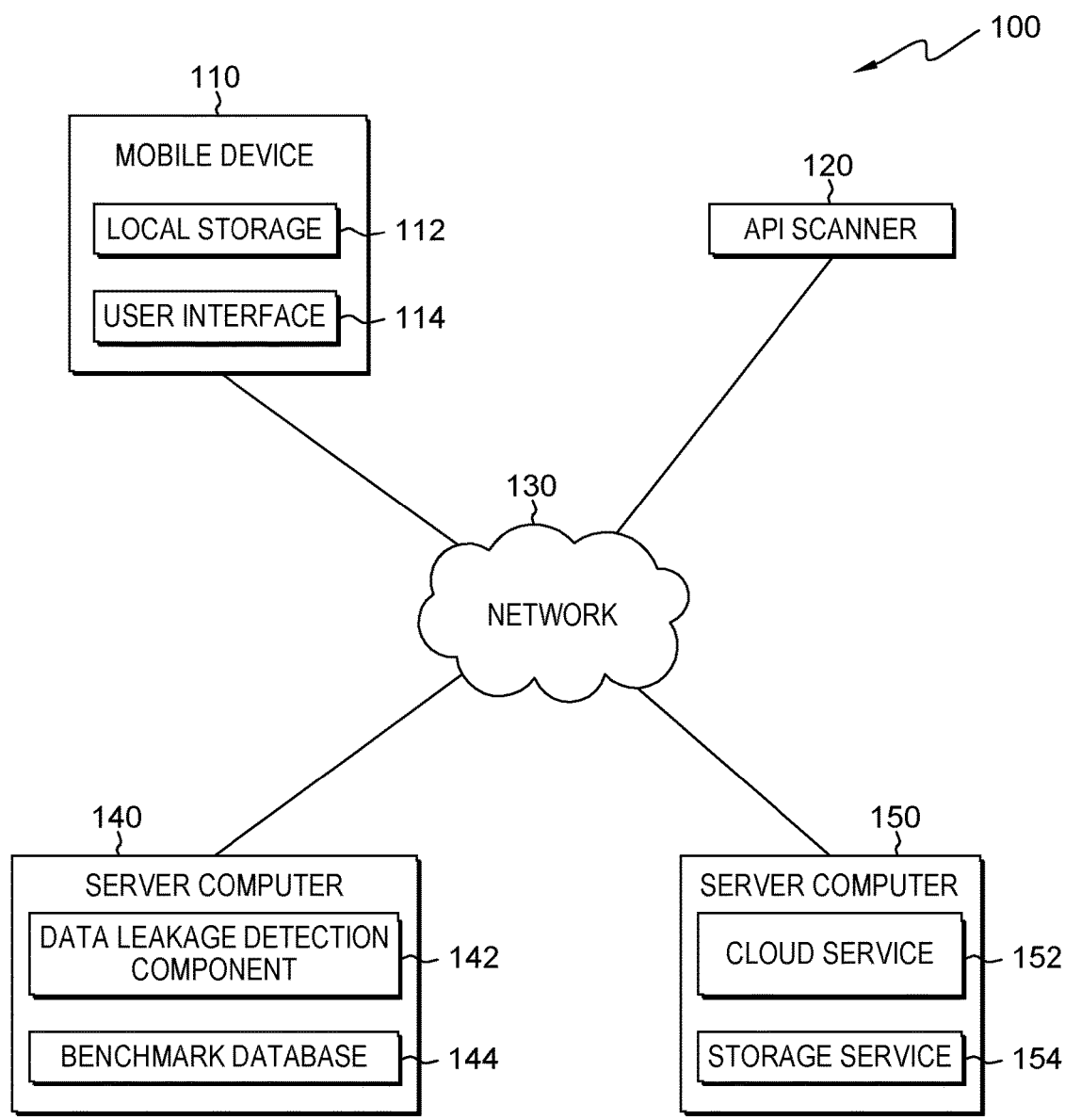

FIG. 1C is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments can be implemented. Many modifications to the depicted environment can be made by those skilled in the art without departing from the scope of the invention as recited by the claims. Cloud security environment 100 includes mobile device 110, API scanner 120, network 130, server computer 140, and server computer 150. Mobile device 110 includes local storage 112, and user interface 114. Server computer 140 includes data leakage detection component 142, and Benchmark database 144. Sever computer 150 includes cloud service 152, and storage system 154.

In various embodiments of the present invention, mobile device 110 can be, but is not limited to a standalone device, a laptop computer, a tablet computer, a netbook computer, a personal computer (PC), a smart phone, a desktop computer, a smart television, a smart watch, or any combination thereof. In another embodiment, mobile device 110 represents a computing system utilizing clustered computers and components to act as a single pool of seamless resources. In general, mobile device 110 can be any computing device or a combination of devices with access to some or all of sever computer 140, sever computer 150, and/or API scanner 120 via network 130. Mobile device 110 can include internal and external hardware components, as depicted and described in further detail with respect to FIG. 3.

In this exemplary embodiment, local storage 112 and user interface 114 are stored on mobile device 110. In other embodiments, some or all of mobile device 110 subcomponents (i.e., local storage 112 and user interface 114) can be stored externally and accessed through a communication network, such as network 130. Network 130 can be, for example, a local area network (LAN), a wide area network (WAN) such as the Internet, or a combination of the two, and can include wired, cloud computing nodes (nodes) 10, wireless, fiber optic or any other connection known in the art. In general, network 120 can be any combination of connections and protocols that can support communications between mobile device 110, API scanner 120, server computer 140, and server computer 150, in accordance with embodiments of the present invention.

In various embodiments, user interface 114 executes locally on mobile device 110 and operates to provide a UI to a user of mobile device 110. User interface 114 further operates to receive user input from a user via the provided user interface, thereby enabling the user to interact with mobile device 110. In one embodiment, user interface 114 provides a user interface that enables a user of mobile device 110 to interact with server computer 140 and/or server computer 150. In this particular embodiment, a user is able to access, edit, share and submit files between mobile device 110 and server computer 140 and/or server computer 150, via user interface 114. For example, a user wanting to access files stored on cloud service 152 using mobile device 110 can use user interface 114 to login and access the files stored on the cloud application (i.e., cloud service 152 and/or storage system 154) via network 130. Furthermore, the user can edit share and or upload files to server computer 140, server computer 150, or any combination thereof using user interface 114. Additionally, in this particular example, a user can store and access files to and from local storage 112 using user interface 114. In a different embodiment, a user can access application programs and software using user interface 114. In alternative embodiments, a user can access, edit, share and submit files between mobile device 110 and server computer 140, API scanner 120 and server computer 150, via user interface 114. In a particular embodiment a user can share and upload files to a different server computer not depicted in FIG. 1.

In various embodiments, local storage 112 and storage system 154 can be a data repository that can be written to and read by one or a combination of mobile device 110, server computer 140, data leakage detection component 146, data leakage detection component 142, API scanner 120, and server computer 150 connected via network 130. Media files, documents, photographs, and any other form of data known in the art can be stored on local storage 112 and storage system 154. In various embodiments, software programs, application programs, and any other programs and/or software known in the art can be stored on local storage 112 and storage system 154. In particular embodiments, local storage 112 and storage system 154 can be written to and read by programs and entities outside of computing environment 100 in order to populate files and/or applications from other trusted mobile devices and/or server computers.

In various embodiments, application programming interface (API) scanner 120 can be, a computing system utilizing a text scanner, at least one API scanner, and/or a group of text scanners. In some embodiments, API scanner 120 can monitor, analyze, and/or record data changes to the program interface, documents, data transactions/exchanges, and/or any other forms of data communication known in the art. In various embodiments, API scanner 120 can parse and tag files and other forms of data being shared between mobile device 110 and sever computer 150. For example, a user wanting to access an application from cloud service 152 can download the document (i.e., submit a user data request). In this particular example, the file can flow through API scanner 120, where the API scanner can record the application usage, file history, file data, user information, and/or user behavior, prior to reaching mobile device 110, and/or any other attribute elements known in the art. In various embodiments, API scanner 120 can receive a request from data leakage detection component 142 to retrieve benchmark data, in which API scanner 120 can identify benchmark data discrepancies between the user data request and the benchmark data stored in the database.

In other embodiments, API scanner 120 can detect a user data request in cloud service 152 when a user data request circumvents the CASB gateway and/or data leakage detection component 142. For example, if a user submits a user data request from a personal mobile device and/or tries to circumvent the CASB gateway, creating a mobile blind spot, then API scanner 120 can detect the user data request and/or user activity in cloud service 152, in which API scanner 120 can re-route the user data request to the CASB gateway and/or data leakage detection component 142. In other embodiments, API scanner 120 can prohibit a user and/or a user data request from accessing cloud service 152. In various embodiments, API canner 120 can retrieve audit data (i.e., benchmark data) to obtain a view of operations from cloud service 152 perspective (i.e., can perform an out of band process). Continuing this particular embodiment, data leakage detection component 142 can monitor traffic on cloud service 152 as it is an in-line device and is able to observe the traffic between server computer 140, server computer 150, API scanner 120, and/or mobile device 110. In various embodiments API scanner 120 can be on server computer 140, server computer 150, mobile device 110, a standalone device, and/or on a server computer and/or mobile device note in environment 100, not depicted in FIG. 1.

In various embodiments, the information collected by API scanner 120 during data transactions between mobile device 110 and server computer 150, cloud service 152, and/or storage system 154 is referred to as attribute elements. In this particular embodiment, once the attribute elements are identified and/or collected and can be stored as benchmark data in Benchmark database 144, in which it can be easily accessed and used as a juxtaposition against any incoming and or outgoing data within environment 100. Attribute elements can be, but are not limited to, file name, file size, file time stamp, geographical location, user identification, time zone, user name, Internet Protocol (IP) address, user behavioral patterns, and any other form of data known in the art. In various embodiments, attribute elements are identified and/or flagged and/or stored in benchmark database 144 they can become benchmark data. Generally, the benchmark data created is treated as a digital finger print of files, documents, users, mobile devices, software, and/or any other forms of data known in the art, that can be used to enforce data leakage policy. In various embodiments, benchmark data is stored in Benchmark database 144; however, it can be stored in various databases. In alternative embodiments, not depicted in FIG. 1, API scanner 120 can have an internal memory system to store benchmark data, IP addresses, files, programs, and/or any other forms of storable data known in the art. Additionally, API scanner 120 can include internal and external hardware components, as depicted and described in further detail with respect to FIG. 4.

In various embodiments, server computer 140 and server computer 150 are each a computing device that can be a standalone device, a server, a laptop computer, a tablet computer, a netbook computer, a cloud service, a personal computer (PC), or a desktop computer. In another embodiment, server computer 140, and server computer 150 each represent a computing system utilizing clustered computers and components to act as a single pool of seamless resources. In general, server computer 140 and server computer 150 are representative of any programmable client device or combination of programmable client devices capable of executing machine-readable program instructions and communicating with other computer devices via a network (i.e., network 120). In this particular embodiment, server computer 140 includes data leakage detection component 142, and benchmark database 144. Sever computer 140, data leakage detection component 142, and/or benchmark database 144 are accessible by mobile device 110, API scanner 120, server computer 150, and any other mobile device or server computer not illustrated in FIG. 1, via network 130.

In various embodiments, data leakage detection component 142 has the ability to monitor and allocate the flow of data between mobile device 110 and server computer 150, and/or server computer 140, via network 130. In various embodiments, data leakage detection component 142 comprises a cloud application security broker (CASB) and/or a CASB gateway. In some embodiments, the CASB and/or CASB gateway can, but are not limited to: identifying, evaluating and analyzing cloud based applications, encrypting or tokenizing sensitive content, detecting and blocking unusual account behavior, storing and comparing data, monitoring data transactions between mobile device 110 and server computer 150, identifying attributes, temporarily storing user data requests and/or benchmark data, detecting security threats, and enforcing management policies and granular policies. In various embodiments, data leakage detection component 142 can track data transactions between mobile device 110 and server computer 150 to develop a data base of benchmark data and/or identify attribute elements to create benchmark data, via CASB gateway. Benchmark data is data that can used as to implement security policy and/or act as template to compare, measure, and/or analyze other data to (i.e., a user data request). In various embodiments, data leakage detection component 142 can create benchmark data based on user data and identified attribute elements, gathered and/or monitored in a user data transaction. In various embodiments, data leakage detection component 142 can monitor and help identify attributes (i.e., data and/or benchmark data) that might be at security risk. In various embodiments, in order to establish a runtime phase/environment, a learning phase is established, in which data leakage detection component 142 can be configured to monitor individual API scanner 120 and/or CASB gateway data transactions and/or activity so that individual dynamic API attributes and/or CASB gateway attributes (i.e., attribute elements) can be determined and/or identified (i.e., creating benchmark data). For example, once a user authenticates their access to server computer 150 and/or cloud service 152, the user can access the data stored on server computer 150, cloud service 152, and/or storage system 154. In this particular example, before the data is transferred and/or communicated from cloud service 152 to mobile device 110 the data passes through API scanner 120 and the CASB gateway, in which the API scanner 120 identifies and flags attribute elements, creating benchmark data and storing the benchmark data on benchmark database 144 to be referenced at a later time. In various embodiments, the identified and/or flagged attribute elements can be sent to administrator to influence security policy. The aforementioned process is known as the learning phase.

In various embodiments, data leakage detection component 142 can use the CASB gateway and the benchmark data stored on benchmark database 144 in various combinations to act as a security measure to prevent unwarranted access or entry into server computer 150, cloud service 152, and/or storage system 154 (i.e., the run phase). For example, before a user can upload any data to cloud service 152, the data (i.e., user data request) passes through data leakage detection component 142, via CASB gateway, in which the user data request held and analyzed for any discrepancies between the benchmark data. In this particular example, if data leakage detection component 142 determines that user data request doesn't consist of discrepancies the benchmark data us updated with any new information on the user data request and the user can upload the data to cloud service 152. Continuing this example, the benchmark data analysis works to prohibit unauthorized access/downloading of data from cloud service 152. As a user is downloading a document from cloud service 152 the document flows through the API scanner into the CASB gateway, where the document is held. In this particular example, data leakage detection component 142 analyzes the document and user attribute elements and compares them to the stored benchmark data to determine if there are discrepancies between the document and/or the user attribute elements. Continuing this example, if the data leakage detection component 142 determines there are no discrepancies between the attribute elements and the benchmark data then the document can be accessed/downloaded; however, if data leakage detection component 142 determines there are discrepancies then data leakage detection component 142 will prohibit user access, and log the discrepancies.

In another example, a user trying to access a document from server computer 150, can use mobile device 110 to access cloud service 152; however, before the user can access any documents, and/or any other form of data, data leakage detection component 142 receives the users request and requires the user to authenticate their access. In this particular example, the user authenticates their access to server computer 150 and/or cloud service 152 via CASB gateway and API scanner 120. Once the user authenticates their access CASB gateway and/or API scanner 120 can enable the user access to server computer 150 and/or cloud service 152, in which a user can access the data stored on server computer 150, cloud service 152, and/or storage system 154.

Continuing this particular example, as the document travels from server computer 150 to mobile device 110, data leakage detection component 142 receives the document, identifies and stores identifying documents data (i.e., attribute elements) on benchmark database 144, creating benchmark data, to be referenced at a later time, this is called the learning phase. In this particular example, once the user is done with the document and wants to upload and/or save the document to server computer 150 (i.e., user data request), data leakage detection component 142, initiates the runtime phase and, receives the document and compares the user data request, via CASB gateway, to the benchmark data to check for discrepancies between the user data request and the benchmark data. In another example, data leakage detection component 142 can receive a user authentication request. In this particular embodiment, data leakage detection component 142 receives a user authentication request to access cloud service 152. In this particular example, data leakage detection component 142 holds the user authentication request within the CASB gateway until the user authentication request can be authenticated.

A user authentication request, can be, but is not limited to a security login request, uploading a file, downloading a file, uploading a document, downloading a document, editing a file and/or document, streaming data, and/or accessing data from a cloud system. For example, a user, using mobile device 110, trying to access a document stored on the SaaS provider (i.e. cloud system 152). Continuing to illustrate the example, before the user can access the SaaS provider data leakage detection component 142 receives a user authentication request from mobile device 110 in order to verify the user's credentials, via the CASB gateway. In some embodiments, data leakage detection component 142 can be responsive to determining the user authentication credentials and either enable or disable access to cloud service 152 based on the user's credentials and/or lack of credentials. In various embodiments, data leakage detection component 142 enables CASB gateway and API scanner 120 to work and communicate conjunctively in order to authenticate a user's authorization and to better assist in unauthorized access to server computer 150, cloud system 152, and or storage system 154. In various embodiments, the benchmark data stored and/or analyzed can be a plurality of benchmark data.

In various embodiments, data leakage detection component 142 can comprise a learning phase, in which data leakage detection component 142 can identify what benchmark data/attributes (i.e., attribute elements) to monitor and/or suggest to monitor to an administrator. For example, data leakage detection component 142 notices a pattern of file size changes from 9:00 PM to 2:00 AM, data leakage detection component 142 can flag attributes (e.g., user data, IP address, file data, etc.) and suggest and/or refer a policy change to an administrator based on the flagged attributes, in which the administrator can implement policy to counter act the potential security threat. In various embodiments, once attributes are flagged by data leakage detection component 142 the flagged attributes can become policy attributes. In other embodiments, data leakage detection component 142 can flag the benchmark data/attribute elements and not send the flagged elements to an administrator about the detection. In various elements, a plurality of attribute elements and/or a plurality of policy attributes can be flagged and/or sent to an administrator. In various embodiments, a plurality of attribute elements can be one or more attribute elements.

In various embodiments, policy attributes can be identified and/or flagged by data leakage detection component 142 based on predetermined conditions. In various embodiments, predetermined conditions can be attributes that data leakage detection component 142 can consider threatening to data and/or cloud security. Predetermined conditions can be, but are not limited to, documents being accessed, edited, and/or deleted outside hours of operation, unauthorized user access, the magnitude of change to a file and/or document, the location of the data transaction, and/or an unidentified IP address. In some embodiments, the learning phase comprises: a user accessing an SaaS application on cloud service 152, via network 130; a user authenticating their user data request at the CASB gateway prior to accessing the SaaS application, in which the CASB gateway triggers API scanner 120 to retrieve information concerning the user data request (i.e., user data and/or application information) through audit interfaces; the user data request transaction occurring at the SaaS application, in which the CASB gateway monitors the data that is transmitted to the SaaS application; the information/data stored from the user data request transaction is stored as benchmark data on the CASB gateway and/or benchmark database 144; and API scanner 120 retrieves the data requested by the user.

In some embodiments, in order to establish the runtime environment, data leakage detection component 142 can be configured to monitor individual API calls so that individual, dynamic API attributes can be determined, and over a set amount of time monitoring, data leakage detection component 142 knows which attributes are changing, and therefore notifies an administrative process that those attributes should be monitored. Continuing this embodiment, an administrative process can then be used to set policy accordingly, i.e. group based or compliance monitoring of those attributes. In various embodiments, data leakage detection component 142 can store user data and other attribute elements on benchmark database 144 and/or storage service 154, in which data leakage detection component 142 can use the collected user data and/or other attribute elements from the learning phase to identity suspicions attribute elements.

In various, data leakage detection component 142 can identify user pattern usage (i.e., user data) and flag attribute elements as suspicious (acting outside predetermined conditions) and send the flag attribute elements to an administrator to review for potential policy changes. For example, data leakage detection component 142 detects that data is being altered by John M in Australia only on Thursdays, but John M is stationed in the United States. Furthering this example, data leakage detection component 142 can flag the documents being accessed, the username, IP address of John M in Australia and John M in the United States, and any other attribute elements data leakage detection component 142 deemed suspicious (acting outside the predetermined conditions) and report them to an administration for potential policy change. In other embodiments, data leakage detection component 142 can create policy changes on its own based on the flagged attribute elements. User data can be, but is not limit to, file name, file size, file location, file time stamp, user geographical location, user identification, time zone, user name, IP address, user behavioral patterns, user identifying information/security information, digital finger print, and or any other form of data and/or identifying data known in the art. Attribute elements can be, but are not limited to, user data information, user data usage, file name, file size, file location, file time stamp, user geographical location, user identification, time zone, user name, IP address, user behavioral patterns, user identifying information/security information, digital finger print, and or any other form of data and/or identifying data known in the art.

For example, a user wanting to access a document from cloud service 152 would authenticate their credentials at the CASB gateway, in which upon successfully authenticating their credentials data leakage detection component 142 instructs API scanner 120 retrieve information about the user's behavior and/or application usage. Further illustrating the example, the user performs a data transaction accessing the desired document, in which data leakage detection component 142 monitors, via CASB gateway the transaction and/or data transmitted to cloud service 152, while API scanner 120 retrieves the document from cloud service 152, and stores the collected data (i.e., attribute elements) as benchmark data as the document flows from API scanner 120, through the CASB gateway, and to the user. The benchmark data collected by data leakage detection component 142 can be used to check for discrepancies in attributes/benchmark data when user's try to upload and/or download information from cloud service 152. Additionally, the benchmark data collected during the learning phase by data leakage detection component 142 assists in increasing data security. In various embodiments, if data leakage detection component 142 detects any discrepancies between the user data request and the benchmark data, data leakage detection component 142 can log and/or store the user data request and/or the discrepancies found in the benchmark data analysis to benchmark database 144, in which the discrepancies can be used to create security policies and/or used to identify data security leaks.

Authenticating credentials can be, but are not limited to, logging and/or storing into a system and/or service using a user name, passcode, fingerprint, retina scan, password, questionnaire, phrase and/or identification code. In various embodiments, authenticating credentials can be interchangeable with authentication request credentials. In other embodiments, attributes that need to be monitored are ones that have dynamic content, with variable lengths. For example, a document where data is being updated, via a word processing program, there'll be an API (i.e., API scanner 120) being used to make those changes/updates. Inside of API scanner 120 will be an attribute that suggests the data to change and the change itself. This kind of attribute needs to be monitored and any unauthorized changes detected. In various embodiments, subsequent to the learning phase, data leakage detection component 142 initiate a runtime phase, in which data leakage detection component 142 analyzes a user data request for discrepancies and/or attributes against the benchmark data created in the learning phase. In various embodiments of the runtime phase, when a user accesses cloud service 152, they are generally already authenticated, by providing data to that cloud service via data leakage detection component 142.

In this particular embodiment, data leakage detection component 142 determines that an attribute that it's monitoring is being modified, and therefore performs an authorization decision to determine whether that user is able to perform this operation to the data requested, and if permitted, the request is passed to the cloud service 152 for processing and an audit record (benchmark data) is logged onto benchmark database 144. In this particular embodiment, benchmark data contains information about the payload so that API scanner 120 (later) can reconcile it as legitimate. Dynamic content can be, but is not limited to, creating responses to requests for data that are customized for each individual. Variable length(s) can refer to any form of data and/or information whose length can vary/doesn't have a fixed length. Data leakage detection component 142 is depicted and described in further detail with respect to FIG. 2.

In various embodiments, benchmark database 144 can be a data repository and/or any database that can be written to and read by one or a combination of mobile device 110, server computer 140, data leakage detection component 142, API scanner 120, and server computer 150 connected via network 130. Media files, documents, photographs, and any other form of data known in the art can be stored on Benchmark database 144. In various embodiments, software programs, application programs, and any other programs known in the art can be stored on local storage 112. In some embodiments, benchmark database 144 can be a CASB database, in which the CASB database monitors and records all data transactions (i.e., user data transactions) between mobile device 102 and server computer 150. Continuing this particular embodiment, CASB database can be an attestation store, in which it can store any changes that are being made so that those can be reconciled with API scanner 120. In other embodiments, benchmark database 144 can store user information, user behavior patterns, IP addresses, and any other user and/or mobile device 110 data known in the art and associated with the user. In a particular embodiment, benchmark database 144 stores benchmark data for all the files and data that flows between mobile device 110 and server computer 150 for a particular user. For example, a user wanting to access and edit a document stored on server computer 150 (more specifically storage system 154) can use mobile device 110 to access the document. In this particular example, the user can use user interface 114 to login and authenticate their ability to access server computer 150 with data leakage detection component 142. In this particular example, once the user is granted access to sever computer 150 the user can submit a user data request to retrieve the desired document, and data leakage detection component 142 takes a log of the file and stores the log in benchmark database 144. This stored data is known as benchmark data. When the user finishes editing the file, the file can pass through data leakage detection component 142 where data leakage detection component 142 compares the edited file with the benchmark data stored in benchmark database 144 before accessing server computer 150.

In various embodiments, cloud service 152 can be any cloud based application service, a group of cloud services and/or cloud systems, software as a service (SaaS), cloud service models, mobile apps, and/or any other 'on-demand software' and or cloud services known in the art. In this particular embodiment, cloud service 152 is a SaaS application that comprises one or more cloud based applications, programs, and/or files. In various embodiments, a user can access, download, and/or launch software programs from cloud service 152. In other embodiments, a user can, but is not limited to, uploading, transferring, and/or saving data, documents, media files, and/software programs to cloud service 152. In yet another embodiment, a user can stream media files and other date from cloud service 152.

Figure 2:
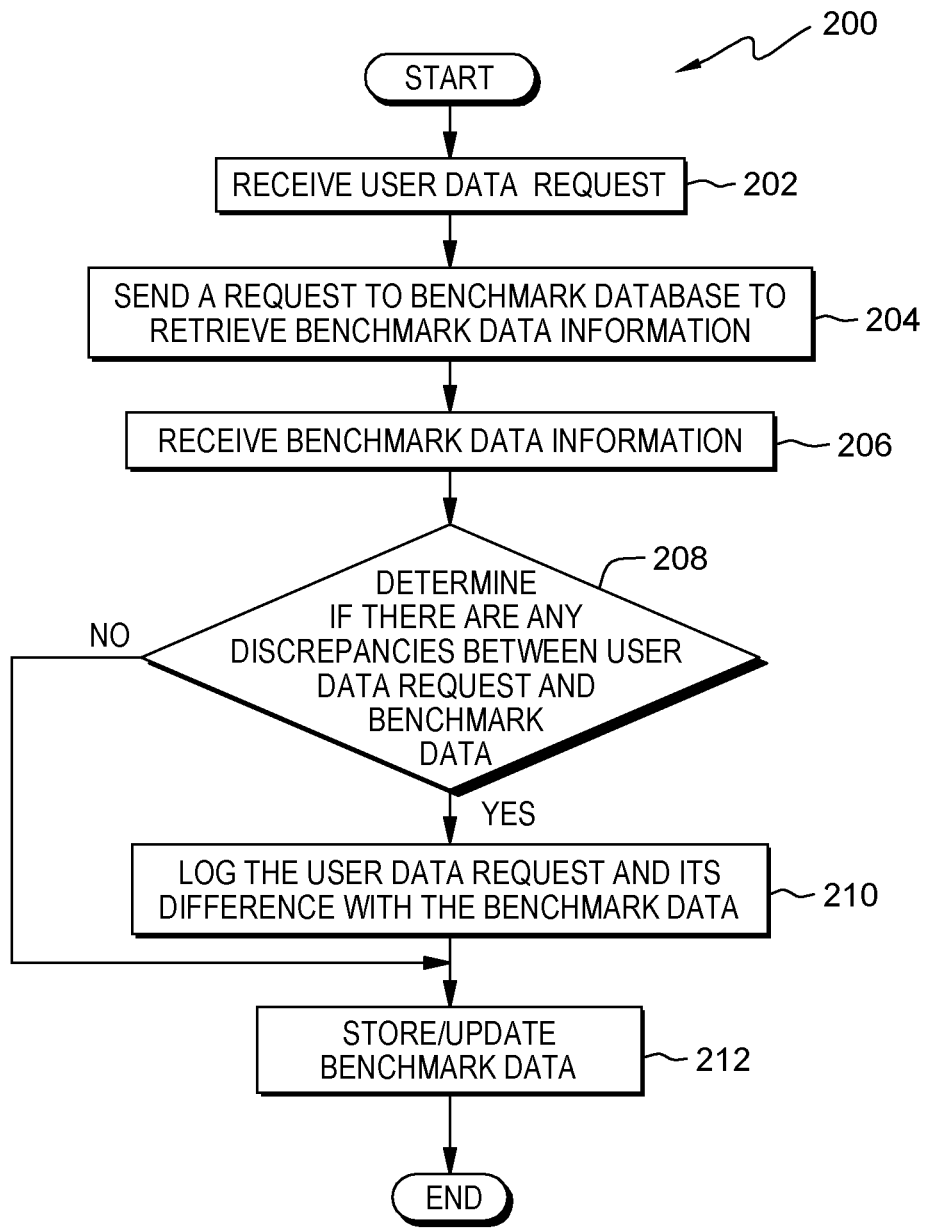
FIG. 2 is a flowchart depicting operational steps of a data leakage detection component, on a server computer within the distributed data processing environment of FIG. 1, for improving data leakage detection in cloud services, in accordance with an embodiment of the present invention.

FIG. 2 is a flowchart depicting operational steps of data leakage detection component 142, generally designated 200, on a server computer(s) within distributed data processing environment 100 of FIG. 1, for cloud based data security, in accordance with an embodiment of the present invention.

In step 202, data leakage detection component 142 receives a user data request to access cloud service 152. In various embodiments, data leakage detection component 142 stores the user data request within the CASB gateway until the user data request is compared against the benchmark data. A user request, can be, but is not limited to a security login request, authentication request, uploading a file, downloading a file, uploading a document, downloading a document, editing a file and/or document, editing and/or updating a password, streaming data, accessing data from cloud service 152, and/or any request made to the cloud by the user. For example, a user, using mobile device 110, wants to access a document stored on the SaaS provider (i.e. cloud service 152); however, the user cannot successfully access the data (e.g., download and/or upload data) without data leakage detection component 142 analyzing and/or comparing the user data request against the benchmark data store in benchmark database 144. In this particular example, before the user can access the cloud service 152 data leakage detection component 142 receives a user data request from mobile device 110 and check for differences/discrepancies between the attribute elements in the user data request and the benchmark data, via the CASB gateway. In this particular example, when the user access the SaaS provider from mobile device 110, the accessed data is retrieved by API scanner 120 and can be temporarily stored and/or logged in the CASB gateway, API scanner 120 and/or benchmark database 144. In various embodiments, data leakage detection component 142 enables CASB gateway and API scanner 120 to work and communicate conjunctively in order to detect the change in the user data request so that the administrator can take necessary actions. The necessary actions can include but are not limited to, corrective and/or preventive security measures.

In step 204, data leakage detection component 142 sends a request to benchmark database 144 to retrieve benchmark data information (i.e., benchmark data) associated with the user data request. In various embodiments, data leakage detection component 142 sends a request to retrieve benchmark data from benchmark database 144 in order to check for discrepancies between the user data request and the benchmark data. In other embodiments, data leakage detection component 142 sends a request to API scanner 120 to retrieve user benchmark data information. User benchmark data information/user benchmark data (i.e., benchmark data) is created by identified and/or flagged attribute elements that can be, but are not limited to, the user's data, file name, file size, file time stamp, geographical location, user identification, time zone, user name, IP address, user behavioral patterns, user identifying information/security information, digital finger print, and or any other form of data and/or identifying data known in the art. In other embodiments, data leakage detection component 142 sends a request to API scanner 120 to retrieve benchmark data from benchmark database 144 and/or cloud service 152.

In step 206, data leakage detection component 142 receives the benchmark data information (i.e., benchmark data) from benchmark database 144. In various embodiments, data leakage detection component 142 receives the benchmark data information from benchmark data base 144 and analyzes the benchmark data, via CASB gateway. In various embodiments, analysis of the benchmark data (i.e., benchmark data analysis) comprises comparing the benchmark data with the user data request. In exemplary embodiments, data leakage detection component 142 can use the benchmark data information gathered from benchmark database 144 and/or cloud service 152 and can use the benchmark data information to determine if there are any changes in the user data request (Step 208). In other embodiments, data leakage detection component 142 can directly and/or automatically access benchmark database 144, without having to request the information the user benchmark data. In some embodiments, data leakage detection component 142 can request user login information, identification codes, security passwords, finger print code, eye scan recognition files, and/or any other forms of security techniques known in the art, in order to check for any discrepancies in the user data request.

In step 208, data leakage detection component 142 determines if there are any discrepancies between the user data request and the benchmark data. In other embodiments, data leakage detection component 142 can determine if attributes elements associated with the user data request match the benchmark data. In various embodiments, data leakage detection component 142 can perform a benchmark data analysis, in which data leakage detection component 142 checks discrepancies/differences between the attribute elements associated with the user data request and the benchmark data (see Table 1). In this particular embodiment, if data leakage detection component 142 detects a discrepancy between the attribute elements associated with the user data request and the benchmark data, then the attribute elements associated with the user data request can be stored and/or logged on benchmark database 144 and the administrator can take actions accordingly. In various embodiments, the administrator can create policy based on the discrepancies/differences found. For example, if data leakage detection component 142 detects discrepancies/differences between the hours of 7:00 PM and 4:00 AM the administrator may implement a policy restricting the flow of data between 7:00 PM and 4:00 AM. In other embodiments, data leakage detection component 142 can create policy independently based on detected discrepancies and/or discrepancy patters. In various embodiments, data leakage detection component 142 can detect discrepancies between the attribute elements associated with the user data request and the user benchmark data, subsequent to benchmark data analysis in the CASB gateway. In some embodiments, data leakage detection component 142 can store and/or log both the successful and unsuccessful user data requests (Step 212) in order to create a database to assist in preventing future potential unwarranted access to server cloud service 152 and/or storage system 154 (i.e., help create policy).

In exemplary embodiments, data leakage detection component 142 can be used to monitor and/or regulate data transactions (e.g., user data transaction(s)). For example, if data leakage detection component 142 detects a discrepancy/differences between a user's edited file (i.e., attribute elements associated with the user data request) and the benchmark data while trying to upload the file to storage system 124 (Yes branch, Step 210) then data leakage detection component 142 can log and/or store the difference between the user data request and the benchmark data. In other embodiments, data leakage detection component 142 is responsive to determining whether there are any discrepancies/differences between the attribute elements associated with the user data request and the benchmark data and can flag, store, and/or send the identified discrepancies/differences if data leakage detection component 142 determines there are discrepancies/differences between the user data request the benchmark data (Yes branch, Step 210). In various embodiments, data leakage detection component 142 can store the failed attempts to better assist in future unwarranted access to system 152 and/or storage system 154. In other embodiments, if data leakage detection component 142 determines there are no discrepancies/differences between the user data request and the benchmark data then data leakage detection component 142 can store and/or update the benchmark data in benchmark database 144 (No branch, Step 212).

A user data transaction, in various embodiments, can be a user data request, a user uploading and/or saving a document, software, a user data request, and/or any other form of data to storage system 154 and/or cloud service 152. In other embodiments, a data transaction can be, a user accessing a file, document, software application and/or any other form of data from storage system 154 and/or cloud service 152. In a different embodiment, a data transaction (i.e., a user data transaction) can also be a user's request to save, upload, stream, download, and/or access data. Generally, a user data transaction can be a user data request, essentially, any flow of data between mobile device 110, server computer 150, cloud service 152, and/or storage system 154. In various embodiments, if a user attempts to upload a file to cloud service 152, data leakage detection component 142 can intercept the file and/or hold the file at the CASB gateway, and compare the file benchmark data to the attempted uploaded file and determine if any unauthorized changes have occurred. In this particular embodiment, if data leakage detection component 142 determines there are discrepancies/differences between the attempted uploaded file and the file benchmark data then data leakage detection component will log the request data and the difference so that administrator can take suitable action.

In a different embodiment, in an attempt to prevent unauthorized data flow from mobile device 110 to cloud service 152, server computer 150, and/or storage system 154, data leakage detection component 142 retrieves the user data request directly from the SaaS provider (i.e., cloud service 152) as the request does not go via the CASB, data leakage detection component 142 determines whether the user's data is different as compared to the data in the benchmark database. In a particular embodiment, data leakage detection component 142 receives a user data transaction and compares the proposed data transaction with the benchmark data already stored in Benchmark database 144, in which data leakage detection component 142 looks for differences between the attribute elements associated with the user data transaction and the benchmark data. In the event data leakage detection component 142 detects a discrepancy between the attribute elements associated with the proposed data transaction and the benchmark (See Table 1) data leakage detection component 142 can end the transaction and prohibit access to API scanner 120, Server Computer 150, cloud service 152, and/or storage system 154. For example, if a user accesses a document from a SaaS provider the document can flow from the SaaS provider through API scanner 120 into the CASB gateway where data leakage detection component 142 can store the files benchmark data in benchmark database 144. In this particular example, once the user is done with the document and wants to upload the edited document back to the SaaS provider then data leakage detection component 142 can compare the edited documents user data with the benchmark data of the original document and analysis for any discrepancies/differences between the edited documents and the original document (See Table. 1), and if a discrepancy is detected data leakage detection component 142 can end the transaction and prohibit access to the SaaS provider. Discrepancies can be, but not limited to, differences in: file name, file size, date and/or time modified, user name and/or user identification, user clearance level, IP address, geographic location, email service, web browser, device fingerprint, and/or browser fingerprint (e.g., cookies).

TABLE 1

| | | A<br>Filename | B<br>Size<br>(KB) | C<br>Modified<br>data | D<br>User |
|---|---|---|---|---|---|
| 1 | API Scanner | Inventory.txt | 1089 | Apr. 19, 2016 23:30 GMT | John |
| 2 | CASB Gateway | Inventory.txt | 1089 | Apr. 19, 2016 23:29 GMT | John@org.1com |
| 3 | API Scanner | Inventory.txt | 1091 | Apr. 19, 2016 23:30 GMT | John |
| 4 | CASB Gateway | Inventory.txt | 1091 | Apr. 19, 2016 23:29 GMT | John@org.1com |
| 5 | API Scanner | Inventory.txt | 1099 | Apr. 19, 2016 23:30 GMT | John |
| 6 | CASB Gateway | Inventory.txt | 1099 | Apr. 19, 2016 23:29 GMT | Steve@org1.com |
| 7 | API Scanner | Inventory.txt | 1098 | Apr. 19, 2016 23:30 GMT | John |
| 8 | CASB Gateway | Inventory.txt | 1091 | Apr. 19, 2016 23:29 GMT | John |

Table 1 demonstrates an example of what data leakage detection component 142 can consider a discrepancy/difference between a file flowing between mobile device 110 and cloud service 152 and/or storage system 154. In this particular example, rows 1 depicts attribute elements being retrieved by API scanner 120 from cloud service 152 and row 2 depicts the benchmark data retrieved by the CASB gateway, which data leakage detection component 142 uses to conducts a juxtaposition between the attribute elements and the benchmark data and trying to identify any differences. As you can see the attribute elements and the benchmark data in row 1 and row 2 are nearly identical (i.e., contain no discrepancies). Similarly, the attribute elements of row 3 match-up very well with the benchmark data in row 4 (i.e., contain no discrepancies). However, there is a discrepancy/difference between the attribute element data in Rows 5 and the benchmark data in row 6. More specifically, there is a discrepancy in the user's credentials, as seen when comparing column D row 5 with column D row 6. Similarly, column B rows 7 and 8 provide an example of discrepancy between file size. In various embodiments, any discrepancies found by data leakage detection component 142 can be labeled suspicious and be investigated. In other embodiments, any discrepancies found by data leakage detection component 142 can be barred from entering the system and held for investigation.

In step 210, data leakage detection component 142 logs the differences and/or the discrepancies between the attribute elements associated with the user data request and the benchmark data. For example, subsequent to data leakage detection component 142 detecting that there are differences between the attribute elements associated with the user data request and the benchmark data, data leakage detection component 142 flags the discrepancies, labels them as suspicious activity, and logs the request data and relevant information in a location where administrator can review it and take suitable action (i.e., create policy). In some embodiments, data leakage detection component 142 can log the flagged discrepancies and/or suspicious activity on benchmark database 144, storage system 154 and/or a third party storage system not depicted in FIG. 1C. In various embodiments, data leakage detection component 142 can log and/or identify one or more discrepancies between identified attribute elements and benchmark data.

In step 212, data leakage detection component 142 stores and/or updates the benchmark data. In various embodiments, data leakage detection component 142 can update the benchmark data log and/or digital fingerprint with new update information. In other embodiments, data leakage detection component 142 can save and/or update benchmark data with the same benchmark information if no changes and/or updates have been made. In various embodiments, the digital fingerprint data/attribute elements obtained by data leakage detection component 142 from API scanner 120 and/or benchmark database 144 is stored in benchmark database 144 as benchmark data. In various embodiments, data leakage detection component 142 takes the attribute elements and creates a log of the benchmark data to compare and contrast incoming and outgoing files, documents, and or programs. In other embodiments, once the digital fingerprint data is collected API scanner 120 and/or data leakage detection component 142 can constantly monitor the flow of data transactions and act as an integrity check. In various embodiments, data leakage detection component 142 can update the benchmark data with newly identified and/or flagged attribute elements.

Figure 3:
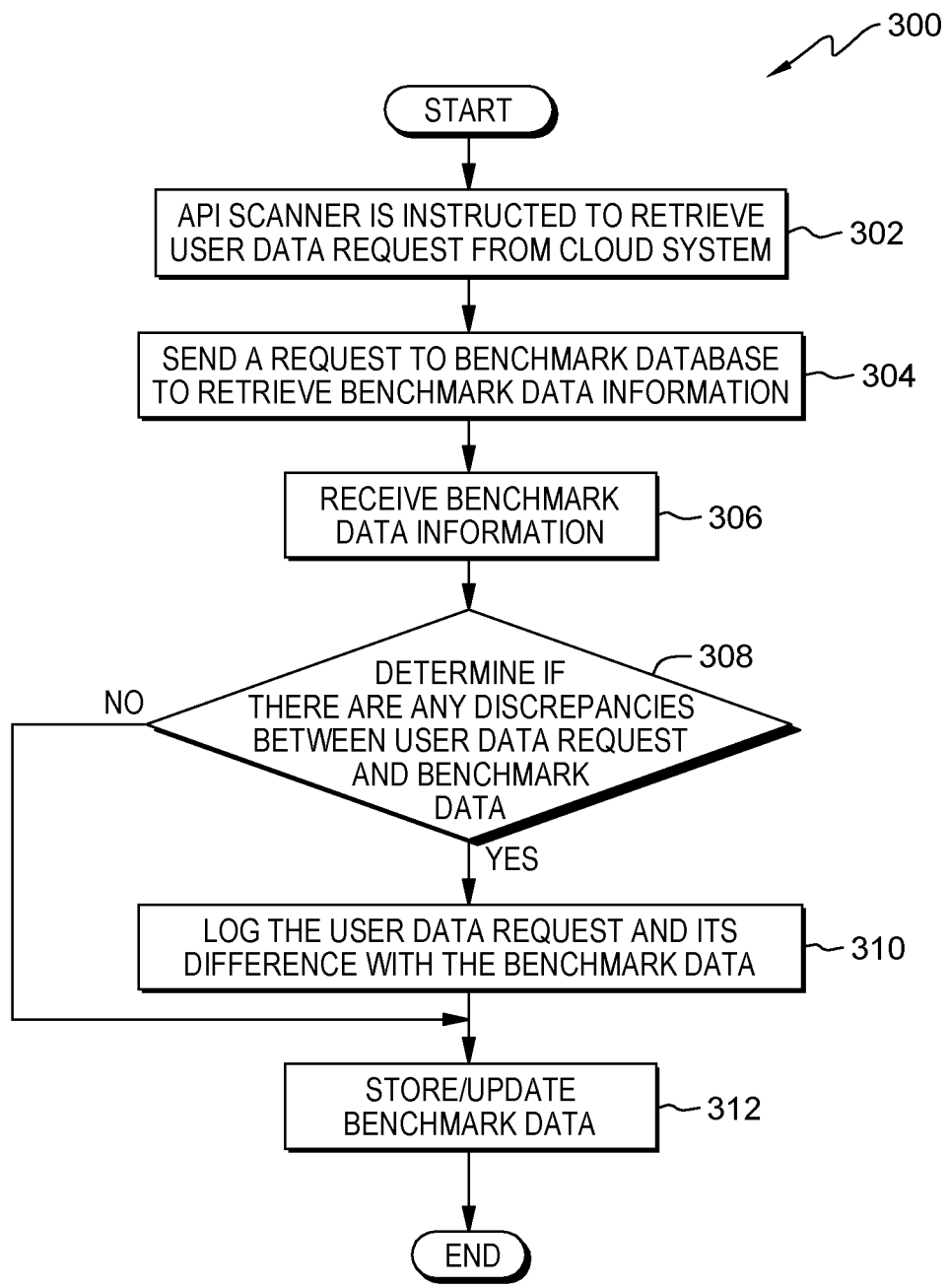
FIG. 3 is a flowchart depicting operational steps of a data leakage detection component, on a client device within the distributed data processing environment of FIG. 1, in accordance with an embodiment of the present invention.

FIG. 3 is a flowchart depicting operational steps of data leakage detection component 142, generally designated 300, on a server computer(s) within distributed data processing environment 100 of FIG. 1, for cloud based data security, in accordance with an embodiment of the present invention. FIG. 3, is an alternative embodiment illustrating CASB being bypassed and/or offline.

In step 302, data leakage detection component 142 instructs API scanner 120 to collect user data request from cloud service 152 (i.e., a SaaS provider) directly. In various embodiments, data leakage detection component 142 will instruct API scanner 120 to retrieve user data request from SaaS provider directly if CASB is offline and/or bypassed by a user. For example, a user trying to access cloud service 152 from their personal mobile device 110 (e.g., personal laptop, smartphone, tablet, and/or desktop computer) bypasses/circumvents the CASB, creating a mobile blind spot. In this particular example, data leakage detection component 142 can instruct API scanner 120 to retrieve user data request from SaaS provider in order to check the user data request for any discrepancies between the benchmark data. In other embodiments, API scanner 120 does require instructions from data leakage detection component 142, and can operate independently. In various embodiments, data leakage detection component 142 can instruct API scanner 120 to send the retrieved user request data to the CASB gateway. In other embodiments, API scanner 120 can detect when a user circumvents the CASB gateway and can notify data leakage detection component 142 and/or an administrator. In various embodiments, API scanner 120 can detect discrepancies that data leakage detection component 142 can miss.

In step 304, data leakage detection component 142 sends a request to benchmark database 144 to retrieve benchmark data information (i.e., benchmark data). In various embodiments, data leakage detection component 142 sends a request to retrieve benchmark data from benchmark database 144 in order to check for discrepancies/differences between the attribute elements associated with the user data request and the benchmark data. In various embodiments, data leakage detection component 142 sends a request to benchmark database 144 to retrieve benchmark data, subsequent API retrieving and/or notifying data leakage detection component 142 about the user data request bypassing the CASB gateway and accessing cloud service 152.

In step 306, data leakage detection component 142 receives the benchmark data information (i.e., benchmark data) from the benchmark database and/or API scanner 120. In various embodiments, data leakage detection component 142 receives the user benchmark data information from benchmark data base 144 and utilizes the benchmark data to analyze the attribute elements associated with the user data request. In various embodiments, API scanner 120 can send the retrieved user data request to the CASB gateway where the attribute elements associated with the user data request can be analyzed and/or compared against the benchmark data. In other embodiments, analysis of the benchmark data (i.e., benchmark data analysis) comprises comparing the benchmark data with the attribute elements associated with the user data request. In exemplary embodiments, data leakage detection component 142 can use the benchmark data information gathered from benchmark database 144 and the attribute elements associated with the user data request information to determine if there are any changes/differences between the two (Step 308). In other embodiments, data leakage detection component 142 can directly and/or automatically access benchmark database 144, without having to request the information the user benchmark data. In some embodiments, data leakage detection component 142 can request user login information, identification codes, security passwords, finger print code, eye scan recognition files, and/or any other forms of security techniques known in the art, in order to check for any discrepancies/differences in the user data request.

In step 308, data leakage detection component 142 determines if there are any discrepancies/differences between the attribute elements associated with the user data request and the benchmark data. In various embodiments, data leakage component 142 can perform a benchmark data analysis, in which data leakage detection component 142 compares the attribute elements associated with the user data request with the benchmark data to detect whether there are discrepancies/differences between the user data request and the benchmark data, (see Table 1 and Table 2). In this particular embodiment, if data leakage detection component 142 detects a discrepancy/differences between the attribute elements associated with the user data request and the user benchmark data, then the user data request can be logged and the administrator can take actions accordingly. In some embodiments, data leakage detection component 142 can store and/or log both the successful and unsuccessful user data requests (Step 212) in order to create a database to assist in preventing future potential unwarranted access to server cloud service 152 and/or storage system 154 (i.e., help create policy).

In exemplary embodiments, data leakage detection component 142 can be used to monitor and/or regulate data transactions. For example, if data leakage detection component 142 detects a discrepancy between a user's edited file (i.e., attribute elements associated with the user data request) and the benchmark data while trying to upload the file to storage system 124 (Yes branch, Step 210) then data leakage detection component 142 can log the difference between the attribute elements associated with the user data request and the benchmark data, terminate the session and deny the user access to cloud service 152. In various embodiments, data leakage detection component 142 can store the failed attempts to better assist in future unwarranted access to system 152 and/or storage system 154. In other embodiments, if data leakage detection component 142 determines there are no discrepancies/differences between the user data request and the benchmark data then data leakage detection component 142 can store and/or update the benchmark data in benchmark database 144 (No branch, Step 212). In various embodiments, API scanner retrieves operation data (i.e., user data request) from cloud service 152, in which API scanner 120 compares the record with the benchmark produced and/or collected by data leakage detection component 142 and/or stored benchmark database 144. In this particular embodiment, if API scanner 120 determines there are discrepancies/differences, it means a potential unauthorized out of band modification has occurred, in which the modification bypassed data leakage detection component 142.

TABLE 2

| | A<br>Filename | B<br>Size<br>(KB) | C<br>Modified<br>data | D<br>User |
|---|---|---|---|---|
| 1 API Scanner | Inventory.txt | 1089 | Apr. 19, 2016 23:30 GMT | John |
| 2 CASB Gateway | Inventory.txt | 1089 | Apr. 19, 2016 23:29 GMT | John@org.1com |
| 3 API Scanner | Inventory.txt | 1091 | Apr. 19, 2016 23:30 GMT | John |
| 4 CASB Gateway | Null | Null | Null | Null |

Table 2 illustrates an example of data leakage detection component 142 analyzing and detecting a discrepancy when a user tries to bypass the CASB gateway to access cloud service 152, placing the database is in a suspect state. This safety check helps in identifying mobile blind spots. In this particular example, a user attempting to access cloud service 152 from a personal and/or unauthorized mobile device 110, which then triggers API scanner 120 to collect the data being accessed by the user, via cloud service 152. In this particular example, once API scanner 120 collects the user data request, data leakage detection component 142 receives the user data request, which is then temporarily stored in CASB gateway to be analyzed. Once the CASB gateway has the user data request data leakage detection component 142 compares the attribute elements associated with the user data request to the benchmark data (i.e., an integrity check and/or benchmark data analysis is performed). Row 1 illustrates the attribute elements identified by API scanner 120 and row 2 illustrates the benchmark data retrieved by CASB gateway and/or data leakage detection component 142 from benchmark database 144. As shown in table 2, there are no differences between the attribute elements and the benchmark data. However, in Row 3 depicts the attribute elements gathered by API scanner 120, and row 4 depicts the benchmark data retrieved by data leakage detection component 142. If the user and/or mobile device 110 are not authorized, then data leakage detection component 142 analysis comparison can look like rows 3 and 4 and data leakage detection component 142 can deny the user access and terminate the session.

In step 310, data leakage detection component 142 logs the differences and/or the discrepancies between the attribute elements associated with the user data request and the benchmark data and terminates the session. For example, subsequent to data leakage detection component 142 detecting that there are differences between the attribute elements associated with the user data request and the benchmark data, it flags the discrepancies as suspicious activity and logs the request data and relevant information in a location where administrator can review it and take suitable action, and terminates the session. In some embodiments, data leakage detection component 142 can log the flagged discrepancies and/or suspicious activity on benchmark database 144, storage system 154 and/or a third party storage system not depicted in FIG. 1C.

In step 312, data leakage detection component 142 stores the benchmark data. In various embodiments, the digital fingerprint data obtained by data leakage detection component 142 from API scanner 120 is stored in benchmark database 144 as benchmark data. In various embodiments, data leakage detection component 142 takes the digital fingerprint data and creates a log of the benchmark data to compare and contrast incoming and outgoing files, documents, and or programs. In other embodiments, once the digital fingerprint data is collected API scanner 120 and/or data leakage detection component 142 can constantly monitor the flow of data transactions and act as an integrity check.

Figure 4:
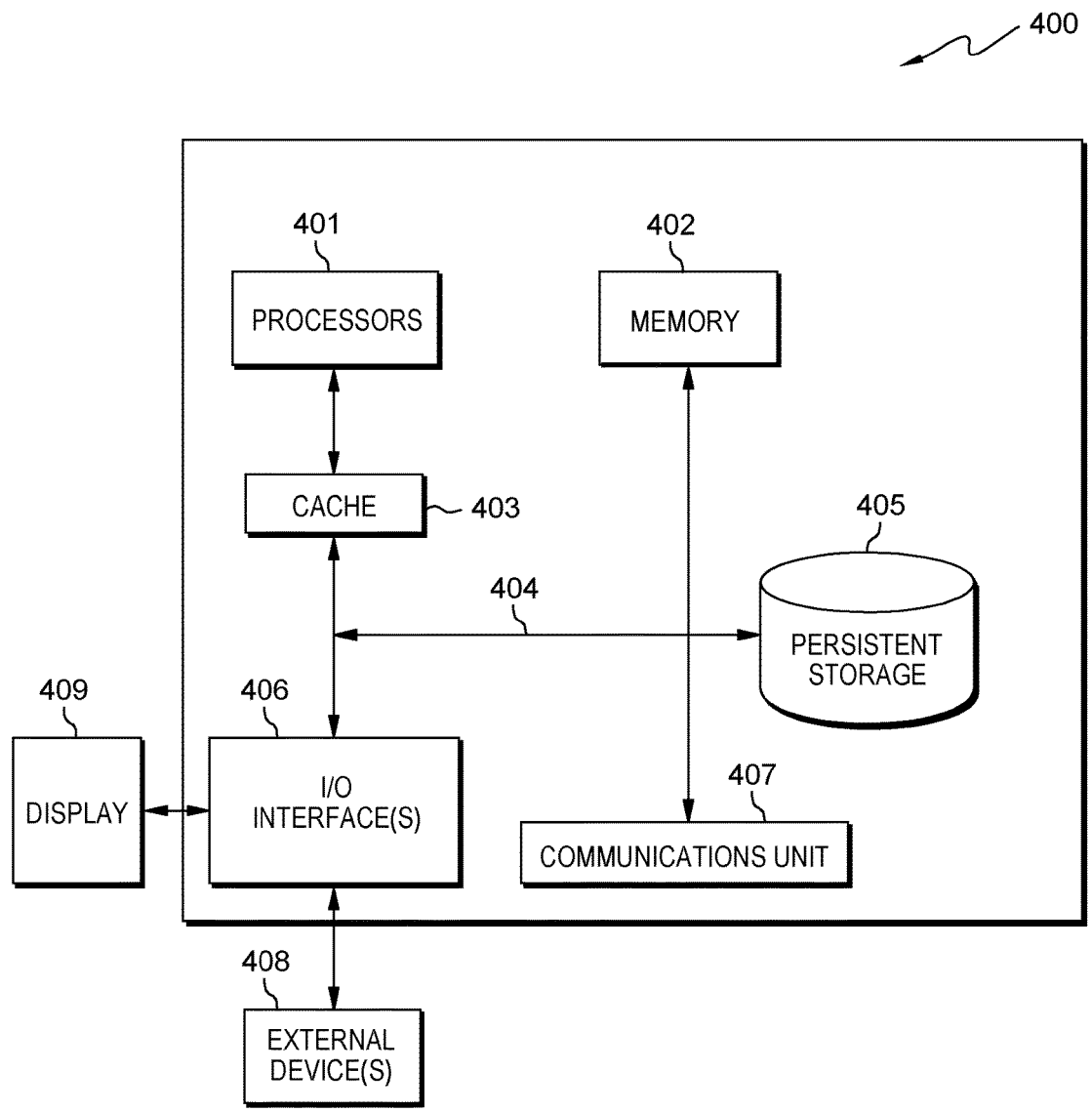
FIG. 4 depicts a block diagram of components of the server computer executing an intelligent mapping within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

FIG. 4 depicts computer system 400, where server computer 140 and/or server computer 150 represents an example of computer system 400 that data leakage detection component 142. The computer system includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/ output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention can be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 can also be removable. For example, a removable hard drive can be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 can provide communications through the use of either or both physical and wireless communications links. Program instructions and data used to practice embodiments of the present invention can be downloaded to persistent storage 405 through communications unit 407.

I/O interface(s) 406 enables for input and output of data with other devices that can be connected to each computer system. For example, I/O interface 406 can provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and can be, for example, a computer monitor.

What is claimed is:

1. A method for creating benchmark data to enhance data leakage protection in cloud based services, the method comprising:
   receiving, by one or more processors, user data;
   monitoring, by the one or more processors, a user data transaction;
   identifying, by the one or more processors, a plurality of attribute elements associated with the user data and the user data transaction;
   monitoring, by the one or more processors, the plurality of attribute elements, wherein the plurality of attribute elements comprises dynamic content and variable lengths;
   creating, by the one or more processors, benchmark data based on the identified plurality of attribute elements and user data gathered from a user data transaction;
   determining, by the one or more processors, there are no discrepancies between the user data transaction and the benchmark data;
   creating, by the one or more processors, policy attributes based on flagging one or more attribute elements associated with the user data and the user data transaction wherein the flagged attribute elements influence security policy;
   sending, by the one or more processors, the policy attributes to an administrator for policy creation;
   storing, by the one or more processors, the benchmark data.

2. The method of claim 1, further comprising:
   restricting, by the one or more processors, entry into a cloud system based on authentication request credentials.

3. The method of claim 1, wherein benchmark data comprises: attribute elements and user data transactions.

4. The method of claim 3, wherein attribute elements comprise: user data information, user data usage, user location, file name, file size, file time stamp, file location, user name, IP address, and user behavioral patterns.

5. A computer program product for creating benchmark data to enhancing data leakage protection in cloud based services, the computer program product comprising:
   one or more computer readable storage media and program instructions stored on the one or more computer readable storage media, the program instructions comprising:
   program instructions to receive user data;
   program instructions to monitor a user data transaction;
   program instructions to identify a plurality of attribute elements associated with the user data and the user data transaction;
   program instructions to monitor the plurality of attribute elements, wherein the plurality of attribute elements comprises dynamic content and variable lengths;
   program instructions to create benchmark data based on the identified plurality of attribute elements and user data gathered from a user data transaction;
   program instructions to determine there are no discrepancies between the user data transaction and the benchmark data;
   program instructions to create policy attributes based on flagging one or more attribute elements associated with the user data and the user data transaction wherein the flagged attribute elements influence security policy; and
   program instructions to send the policy attributes to an administrator for policy creation.

6. The computer program product of claim 5, further comprising:
   program instructions to receive a user data request, wherein the user data request is associated with accessing a cloud service;

program instructions to request benchmark data associated with the user data request program instructions to receive the benchmark data from a benchmark database;

program instructions to determine there are no discrepancies between attribute elements associated with the user data request matches and the benchmark data;

program instructions to log the user data request and discrepancies identified between the user data request and the benchmark data, wherein the logged user data request and the discrepancies can be used to make policy, and prohibiting the user from accessing the cloud service; and responsive to determining the user data request does match the benchmark data, program instructions to store the benchmark data in the benchmark database.

7. The computer program product of claim 6, wherein determining, further comprises:

program instructions to determining access to the cloud service based on the results of benchmark data analysis, wherein the user's data request is permitted access to enter the cloud service if there are no discrepancies found in the benchmark analysis, and, wherein the user's data request is denied access to enter the cloud service if there are discrepancies found in the benchmark data analysis.

8. The computer program product of claim 7, wherein the benchmark data analysis is conducted by a CASB gateway, wherein the CASB gateway identifies discrepancies between the user data request and the benchmark data.

9. The computer program product of claim 6, further comprising:

program instructions to send a request to a benchmark database to retrieve benchmark data, wherein the program instructions to send the request comprises:

program instructions to send a request to an API scanner to retrieve benchmark data, wherein the API scanner identifies benchmark data discrepancies between the user data request and the benchmark data stored in the benchmark database.

10. The computer program product of claim 9, wherein the API scanner detects user data request in the cloud service when a user data request circumvents a CASB gateway.

11. The computer program product of claim 6, wherein benchmark data comprises: attribute elements and user data transaction, and, wherein attribute elements comprise: user data information, user data usage, user location, file name, file size, file time stamp, file location, user name, IP address, and user behavioral patterns.

12. A computer system comprising:
one or more computer processors;
one or more computer readable storage devices;
program instructions stored on the one or more computer readable storage devices for execution by at least one of the one or more computer processors, the stored program instructions comprising:
program instructions to, receive user data;
program instructions to, monitor a user data transaction;
program instructions to, identify a plurality of attribute elements;
program instructions to monitor the plurality of attribute elements, wherein the plurality of attribute elements comprises dynamic content and variable lengths program instructions to, create benchmark data based on one or more identified attributes and user data gathered from a user data transaction;

program instructions to determine there are no discrepancies between the user data transaction and the benchmark data;

program instructions to create policy attributes based on flagging one or more attribute elements associated with the user data and the user data transaction wherein the flagged attribute elements influence security policy; and program instructions to send the policy attributes to an administrator for policy creation.

13. The computer system of claim 12, further comprising:
program instructions to, store the benchmark data;
program instructions to, receive a user data request, wherein the user data request is associated with accessing a cloud service;

program instructions to, request benchmark data associated with the user data request program instructions to, receive the benchmark data from a benchmark database;

program instructions to, determine there are no discrepancies between attribute elements associated with the user data request and the benchmark data;

program instructions to, log the user data request and discrepancies identified between the user data request and the benchmark data, wherein the logged user data request and discrepancies can be used to make policy, and prohibit the user from accessing the could service program instructions to, create policy attributes based on flagging one or more attribute elements associated with the user data and the user data transaction; and program instructions to, send the policy attributes to an administrator for policy creation.

14. The computer system of claim 12, further comprising:
responsive to determining the user data request does match the benchmark data, program instructions to, store the benchmark data in the benchmark database.

15. The computer system of claim 12, wherein determining, further comprises:

program instructions to determine access to the cloud service based on the results of benchmark data analysis, wherein the user's data request is permitted access to enter the cloud service if there are no discrepancies found in the benchmark analysis, and, wherein the user's data request is denied access to enter the cloud service if there are discrepancies found in the benchmark data analysis.

16. The computer system of claim 15, wherein the benchmark data analysis is conducted by a CASB gateway, wherein the CASB gateway identifies discrepancies between the user data request and the benchmark data.

17. The computer system of claim 12, further comprising:
program instructions to send a request to a benchmark database to retrieve benchmark data, wherein the program instructions to send the request comprises:
program instructions to, send a request to an API scanner to retrieve benchmark data, wherein the API scanner detects user data request in the cloud service when a user data request circumvents a CASB gateway.

* * * * *